United States Patent [19]

Jackson et al.

[11] Patent Number: 4,752,142
[45] Date of Patent: Jun. 21, 1988

[54] BALL SLIDE SYSTEM

[76] Inventors: Paul A. S. Jackson, 1, Black Bear Close, Bettws Newydd, Abergavenny; Andrew C. Jackson, Dan-yr-Heol Cottage, Upper Llanover, Abergavenny, both of Wales

[21] Appl. No.: 937,942

[22] Filed: Dec. 4, 1986

[30] Foreign Application Priority Data

Dec. 4, 1985 [GB] United Kingdom ............... 8529940

[51] Int. Cl.⁴ .............................................. F16C 29/04
[52] U.S. Cl. .................................................... 384/18
[58] Field of Search ........................... 384/18, 49, 38; 312/350, 341 R

[56] References Cited

U.S. PATENT DOCUMENTS 4,544,212 10/1985 Parzefall et al. ...................... 384/49
4,569,563 2/1986 Fourrey ................................ 384/49
4,606,588 8/1986 Koch .................................... 384/18

FOREIGN PATENT DOCUMENTS 727787 12/1953 United Kingdom .
2061705 10/1980 United Kingdom .
2079145 7/1981 United Kingdom .
2107179 10/1982 United Kingdom .

Primary Examiner—Lenard A. Footland
Attorney, Agent, or Firm—Kinney & Lange

[57] ABSTRACT

For supporting a drawer in a filing cabinet an inner runner runs on three sets of balls within an outer runner. The balls are supported by a cage. The three sets of balls are in a triangular disposition and the inner runner has lobes extending across the sides of the triangle between the balls and a stem which passes between the balls and emerges through a slot between edges of the outer channel-section runner.

8 Claims, 2 Drawing Sheets

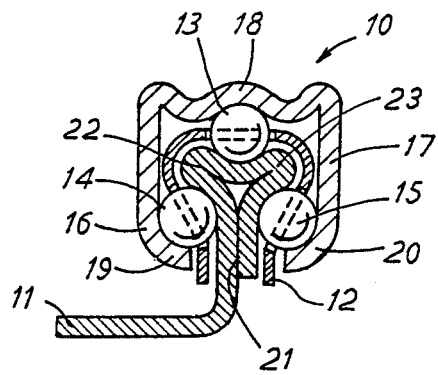
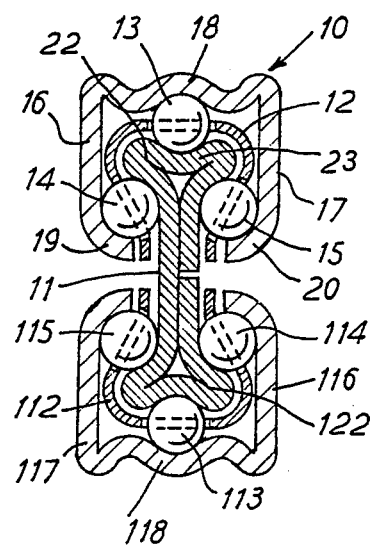
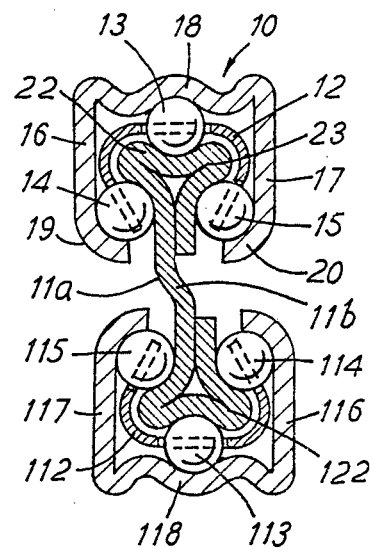

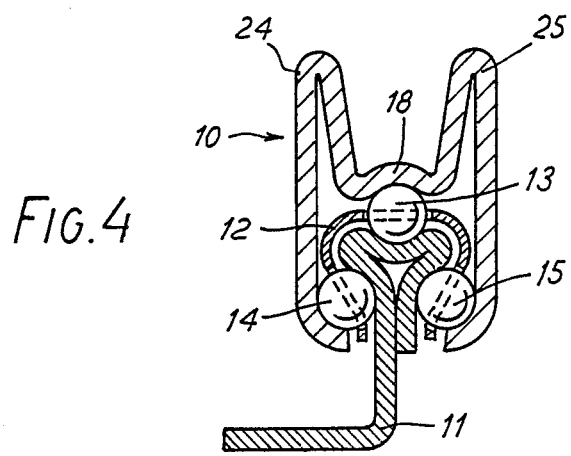
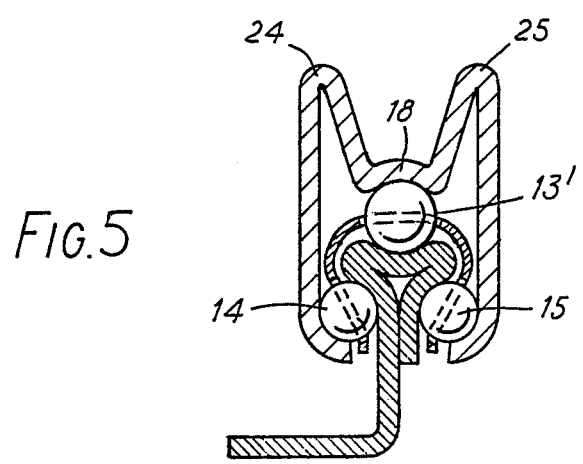

BALL SLIDE SYSTEM

BACKGROUND OF THE INVENTION

1. Field of the Invention

The present invention relates to a ball slide system of the kind which is used, for example, to support drawers in filing cabinets.

2. Description of the Prior Art

Conventional ball slides normally have upper and lower ball races which provide good support for the weight acting in a vertical plane but are weak in a direction perpendicular to the plane of the ball races.

SUMMARY OF THE INVENTION

According to the present invention there is provided a ball slide system comprising an inner runner, an outer runner and three sets of balls interposed between the runners arranged in a triangular array, as seen in a cross-section of the runners, the inner and outer runners being shaped to provide three tracks for the three sets of balls, wherein the inner runner comprises three lobes, as seen in a cross-section of the runner, each lobe extending from the centre of the triangular array outwardly between a respective pair of sets of the balls beyond the line joining the centres of the said two sets of balls, the inner runner further comprising a stem extending from one of the lobes outwardly through a slot in the outer runner.

The extension of the lobes of the inner runner between the sets of balls ensures a good distribution of load between the balls regardless of the direction of the load. In addition, the arrangement provides a good resistance to rotational movement of the inner runner within the outer runner and prevents the ball slide from tightening and becoming jammed.

The resistance to rotation and the even distribution of load between the balls are improved if the sets of balls are arranged in an isosceles triangle or equilateral triangle, as seen in a cross-section. In the case of the isosceles triangle, the stem of the inner runner will extend from the base of the triangle.

The inner runner is preferably formed to have a Y-shape in cross-section. The two arms of the Y forming two lobes of the runner and the stem of the Y forming the third lobe and stem of the runner.

The lobes of the inner runner must extend sufficiently far between the sets of the balls to ensure that there is adequate bearing surface between the inner runner and the balls.

BRIEF DESCRIPTION OF THE DRAWINGS

Embodiments of the present invention will now be described with reference to the accompanying drawings in which:

FIG. 1 is a cross-section of a single extension ball slide;

FIG. 2 is a cross-section of a double-extension ball slide;

FIG. 3 is a cross-section of a modified double-extending ball slide;

FIGS. 4 and 5 show modifications of the ball slide of FIG. 1.

DETAILED DESCRIPTION OF THE PREFERRED EMBODIMENTS

Referring first to FIG. 1, this shows an outer runner 10, an inner runner 11, and a ball cage 12 which supports three sets of balls 13, 14 and 15. The outer runner 10, which encloses the balls and the ball cage 12, is of generally rectangular channel section with two flat parallel sides 16 and 17 which serve for attachment of the runner 10 to a cabinet or other fixed support. The base 18 of the runner 10 is shaped to provide a track for the balls 13. The sides 16 and 17 are bent in at their edges 19 and 20 to provide tracks for the balls 14 and 15, respectively, and to retain the balls and ball cage within the outer runner 10.

The inner runner 11 is of Y shape in cross-section with the stem 21 extending out through the slot between the edges 19 and 20 for attachment to a drawer or other member which is to be supported. The arms 22 and 23 of the Y extend between the pairs of balls 14, 13 and 13, 15, respectively. It will be seen that the inner runner 11 is formed from rolled steel so that the stem 21 and arms 22 and 23 are of double thickness and the angles between the stem and the arms and between the two arms are rounded to form tracks for the three sets of balls. As seen in all the Figures, each of the angles is rounded to have the same radius as the balls in the track defined by that angle.

It can be seen that by having each of the two arms of the Y in the form of lobes extending beyond the line joining the centres of the two respective sets of balls, there is adequate bearing surface between the inner runner and the balls to provide an even distribution of load between the balls. This ensures the ball slide will not tighten or become jammed when a load is applied that would tend to twist the inner runner. This makes it possible to use the ball slide in different orientations.

In particular the ball-slide may be inverted without affecting its basic operation, though the loading on the balls will be different. Thus for a double-extension slide the structure of FIG. 2 consists of a slide as described with reference to FIG. 1 together with a similar slide in inverted position with the two inner runners formed integrally with one another. In FIG. 2 the parts of the upper slide are given the same references as in FIG. 1, while the corresponding parts of the inverted lower slide have the same references with 100 added, thus ball 114 corresponds to ball 14. The inner runner 11 is common to the two slides and comprises two Y shaped parts joined by their stems.

To increase the clearance between a sliding drawer and the walls of the cabinet, for example, the double extension system shown in FIG. 3 can be used. The inner runner 11a is formed with an offset crank 11b. The side 16 of the upper outer runner 10 may be attached to the drawer. The side 117 of the lower outer runner will then clear the side of the drawer by the length of the offset 11b. The offset crank 11b will also strengthen the inner runner 11a.

FIGS. 4 and 5 show modification of FIG. 1 in which the top horns 24 and 25 of the outer runner have been extended to increase the bending moment of the runner. The central region 18 between the horns 24 and 25 still forms the track for the ball 13. In the case of FIG. 5 a larger-size ball 13' is used which is of greater diameter than the balls 14 and 15.

Both the inner and outer runners can be made of rolled steel or similar hard material or can be made as extrusions.

We claim:

1. In a ball slide system having an outer runner, an inner runner of Y formation with a stem extending through a slot in the outer runner and with two arms, and three sets of balls interposed between the runners in a triangular array, the improvement which comprises:

the inner runner being formed from a metal sheet with the two arms of the inner runner of double sheet thickness and forming two lobes extending outwardly between respective pairs of sets of balls beyond the line joining the centers of the two sets of balls, and with the stem also of double sheet thickness and extending outwardly between the remaining pair of sets of balls, and connecting angles between the two arms and the stem and between the two arms themselves which are rounded to define tracks for the three sets of balls.

2. A ball slide system according to claim 1, wherein the triangular array is an isosceles triangle, the stem extending outwardly from the base of the triangle.

3. A ball slide system according to claim 1, wherein the triangular arry is an equilateral triangle.

4. A ball slide system according to claim 1 wherein each of the rounded connecting angles has a radius equal to the radius of the balls of the set of balls for which that angle defines a track.

5. A ball slide system according to claim 1, wherein the outer runner is of generally rectangular channel sections with the base of the channel deformed to provide one ball track and with turned in edges to the sides of the channel providing the other two tracks.

6. A ball slide system according to claim 1, wherein the balls of the three sets are of the same size.

7. A ball slide system according to claim 1, wherein, for double extension, two inner runners are integral with one another and run in respective outer runners of which one is inverted with respect to the other.

8. A ball slide system according to claim 7, wherein the two inner runners are offset with respect to each other.

* * * * *

Disclaimer 4,752,142.—*Paul A. S. Jackson* and *Andrew C. Jackson*, both of Abergavenny, Wales. BALL SLIDE SYSTEM. Patent dated June 21, 1988. Disclaimer filed Dec. 22, 1988, by the *inventors*.

Hereby enters this disclaimer to claim 4 of said patent.

[*Official Gazette March 7, 1989.*]